United States Patent
Cocias et al.

(10) Patent No.: US 10,635,935 B2
(45) Date of Patent: Apr. 28, 2020

(54) GENERATING TRAINING IMAGES FOR MACHINE LEARNING-BASED OBJECTION RECOGNITION SYSTEMS

(71) Applicant: Elektrobit Automotive GmbH, Erlangen (DE)

(72) Inventors: Tiberiu Cocias, Sacele (RO); Cosmin Ginerica, Brasov (RO); Sorin Grigorescu, Brasov (RO); Gigel Macesanu, Sacele (RO); Bogdan Transnea, Brasov (RO)

(73) Assignee: Elektrobit Automotive GmbH, Erlangen (DE)

( * ) Notice: Subject to any disclaimer, the term of this patent is extended or adjusted under 35 U.S.C. 154(b) by 56 days.

(21) Appl. No.: 15/845,429

(22) Filed: Dec. 18, 2017

(65) Prior Publication Data

US 2018/0189607 A1    Jul. 5, 2018

(30) Foreign Application Priority Data

Dec. 29, 2016 (EP) .................................... 16465563

(51) Int. Cl.
*G06K 9/62* (2006.01)
*G06K 9/00* (2006.01)

(52) U.S. Cl.
CPC ....... *G06K 9/6256* (2013.01); *G06K 9/00818* (2013.01); *G06K 9/6255* (2013.01); *G06K 9/6215* (2013.01)

(58) Field of Classification Search
CPC ............. G06K 9/00818; G06K 9/6256; G06K 9/6255; G06K 9/6215
See application file for complete search history.

(56) References Cited

U.S. PATENT DOCUMENTS

| 9,558,411 B1* | 1/2017 | Ferguson ........... G06K 9/00818 |
| 2006/0056696 A1 | 3/2006 | Jun et al. |
| 2008/0187174 A1* | 8/2008 | Metaxas ............ G06K 9/00335 382/103 |
| 2016/0093244 A1* | 3/2016 | Kazmierski ........... G06F 3/1446 345/1.3 |

(Continued)

FOREIGN PATENT DOCUMENTS

DE    102005062154 A1    7/2007

OTHER PUBLICATIONS

Search Report dated Jun. 26, 2017 for corresponding European Patent Application No. 16465563.1.

*Primary Examiner* — Santiago Garcia (57) ABSTRACT

A method and computing device, for generating training image data for a machine learning-based object recognition system is described. The method comprises receiving generic image data of an object type, receiving recorded image data related to the object type, and modifying the generic image data with respect to at least one imaging-related parameter. The method further comprises determining a degree of similarity between the modified generic image data and the recorded image data, and, when the determined degree of similarity fulfills a similarity condition, storing the modified generic image data as generated training image data of the object type. Further described are a computing device, a computer program product, a system and a motor vehicle.

13 Claims, 6 Drawing Sheets

(56) References Cited

U.S. PATENT DOCUMENTS

| | | | |
|---|---|---|---|
| 2016/0104057 A1* | 4/2016 | Shen | G06F 16/583 |
| | | | 382/159 |
| 2016/0162750 A1* | 6/2016 | Haselhoff | G06K 9/00832 |
| | | | 382/103 |
| 2016/0203380 A1 | 7/2016 | Bulan et al. | |
| 2016/0321523 A1* | 11/2016 | Sen | G06T 5/002 |
| 2017/0045769 A1* | 2/2017 | Watson | G02F 1/13336 |
| 2017/0147608 A1* | 5/2017 | Zhang | G06F 16/24578 |
| 2017/0236013 A1* | 8/2017 | Clayton | G06K 9/00369 |
| | | | 382/104 |
| 2018/0096191 A1* | 4/2018 | Wan | G06K 9/6255 |
| 2018/0136332 A1* | 5/2018 | Barfield, Jr. | G06K 9/00805 |
| 2018/0150274 A1* | 5/2018 | Shin | G02F 1/13454 |
| 2018/0189609 A1* | 7/2018 | Park | G06K 9/6256 |
| 2018/0232900 A1* | 8/2018 | Kraft | G06T 7/62 |
| 2019/0080200 A1* | 3/2019 | Mishra | G06N 3/08 |
| 2019/0080205 A1* | 3/2019 | Kaufhold | G06N 3/0481 |

* cited by examiner

| Real-world images 710 | Artificial set 1 720 | Artificial set 2 730 |
|---|---|---|
| | | |
| 108.629; 107.754 | 92.8684; 97.0125 | 107.406; 108.332 |
| 110.502; 116.058 | 113.065; 101.975 | 122.906; 116.891 |
| 103.045; 102.928 | 85.1123; 86.1474 | 110.151; 105.196 |
| 104.055; 96.6866 | 116.49; 114.923 | 117.766; 109.646 |
| 101.076; 97.1181 | 99.9731; 104.416 | 108.849; 106.869 |
| | $D_B = 0.0150913$ | $D_B = 0.0194982$ |

GENERATING TRAINING IMAGES FOR MACHINE LEARNING-BASED OBJECTION RECOGNITION SYSTEMS

TECHNICAL FIELD

The present disclosure generally relates to image generation. It relates particularly to a method for generating training image data for a machine learning-based object recognition system. It further relates to a computing device, a computer program product, a system and a motor vehicle.

BACKGROUND

In modern driver assistance systems, and also in other contexts, object recognition systems have become an important means, for example, to increase a driver's convenience and safety as well as the safety of the surrounding traffic. Object recognition systems are available which not only detect the presence of an object but which are suited to identify and distinguish between particular objects, or object types, based on recorded image data.

Automatically recognizing a particular object type, for example, based on live images of an onboard car camera, is made difficult by varying imaging conditions in typical use scenarios. Such conditions include the technical properties and settings of the camera(s) used as well as differences in lighting and weather conditions under which an object may be recorded. Moreover, objects of the same object type may appear differently, for example, due to differences in the individual shading or orientation of each object or due to the individual image background.

For an object recognition system to reliably recognize an object in typical use scenarios, therefore, it is often not sufficient to provide a generic model, such as an idealized image representation, of the object or object type. Instead, object recognition systems are known which can be trained by means of machine learning based on a larger number of real-life images of the object or object type. Such images are acquired under a range of variable imaging conditions and are then manually selected and labelled as pertaining to the object type. Based on such labelled, real-life training images the system is then trained to recognize the object type under a corresponding range of possible imaging conditions. Meanwhile, the effect of the described machine learning is typically improved by providing a larger amount of training images recorded under different imaging conditions.

Object recognition systems often need to become adapted to new object types. This occurs, for example, when a driver of a car that is equipped with an object recognition system changes from one environment, for which the system has been trained, to a different environment, for which the system has not been trained. For example, a driver may change his or her position to a region where different traffic-related standards are employed. Such differences often concern the form or the style of traffic signs, road markings, registration plates etc. An object recognition system that is configured to automatically recognize and inform the driver about particular traffic signs, for example, may no longer work reliably in a new environment, as it may fail to recognize traffic signs that correspond to the different standards employed there. In order for a machine learning-based object recognition system to become trained with respect to such new object types, therefore, conventional techniques require the provision of additional sets of training images of each new object or object type. In accordance with the above, this requires that the images of each set have been recorded under a corresponding range of imaging conditions and have been manually labelled as pertaining to the new object type.

Algorithms for image analysis are known which may become computer-implemented or be performed in a computer-assisted way. Moreover, a method for nonlinear component analysis, commonly referred to as Kernel Principal Component Analysis (KPCA), is described in B. Schölkopf et al., "Nonlinear Component Analysis as a Kernel Eigenvalue Problem", *Neural Computation*, Massachusetts Institute of Technology, vol. 10, no. 5, 1998, p. 1299-1319.

The provision of recorded and manually labelled training images pertaining to individual object types is time and resource consuming.

SUMMARY

There is thus a need for a technique that mitigates or avoids the aforementioned drawbacks.

According to a first aspect, a method, performed by a computing device, for generating training image data for a machine learning-based object recognition system is provided. The method comprises receiving generic image data of an object type, receiving recorded image data related to the object type, and modifying the generic image data with respect to at least one imaging-related parameter. The method further comprises determining a degree of similarity between the modified generic image data and the recorded image data, and, when the determined degree of similarity fulfills a similarity condition, storing the modified generic image data as generated training image data of the object type.

Determining the similarity may comprise subjecting the modified generic image data and the recorded image data to Kernel Principal Component Analysis, KPCA. The modified generic image data and the recorded image data may be subjected to KPCA independent from one another.

The image data may become pre-processed prior to subjecting it to KPCA. Preprocessing the image data may comprise selecting and/or transforming at least parts of the image data in accordance with a predetermined rule.

Determining the similarity may comprise transforming the modified generic image data and the recorded image data using Local Binary Patterns, LBP. The Local Binary Patterns may comprise extended local binary patterns, eLBP. The transforming may be part of a pre-processing of the image data. In that case, the modified generic image data and the recorded image data may become transformed using Local Binary Patterns, LBP, prior to subjecting the transformed image data to Kernel Principal Component Analysis, KPCA. Transforming the image data using the LBP may correspond to a transformation of the image data from a picture space to a feature space. The LBP may be based on a local image brightness.

The degree of similarity may be determined based on a Bhattacharyya distance between data representative of the modified generic image data and data representative of the recorded image data. In addition or as an alternative, the degree of similarity may be determined based on a Euclidean distance between data representative of the modified generic image data and data representative of the recorded image data. The data representative of the image data may comprise principal components of at least parts of the image data, the principal components being determined by the subjecting of the image data to KPCA.

The method may further comprise, when the determined degree of similarity fails to fulfill the similarity condition, rejecting the modified generic image data. The similarity condition may comprise a threshold degree of similarity. The threshold degree of similarity may be determined based on a threshold Bhattacharyya distance and/or a threshold Euclidean distance. The threshold degree of similarity may be predetermined. In addition or as an alternative, the threshold degree of similarity may be determined at least partly based on a degree of similarity associated with generic image data that has been modified differently in accordance with the method described herein.

The recorded image data may comprise one or more recorded image data sets. Each recorded image data set may comprise data corresponding to a recorded image related to the object type. The recorded image related to the object type may be a recorded image of an object of the object type. In addition or as an alternative, the object type may be a first object type and the recorded image related to the object type may be a recorded image of a second object type different from the first object type. In that case, the second object type may be similar to the first object type with regard to a photographic appearance and or a function of the first and the second object types.

The modified generic image data may comprise one or more modified image data sets. Each modified image data set may comprise data corresponding to a generated image of the object type. An amount of modified image data sets may be larger than an amount of recorded image data sets.

At least two of the modified image data sets may be produced by repeatedly modifying the generic image data differently with respect to the imaging-related parameter. In addition or as an alternative, at least two of the modified image data sets may be produced by repeatedly modifying the generic image data with respect to different imaging-related parameters, respectively.

Modifying the generic image data may be performed repeatedly. The imaging-related parameter may be varied by at least a predetermined amount between successive modifications of the generic image data.

The at least one imaging-related parameter may comprise fisheye distortion, color randomizing, perspective, shadow, noise, blur, gain, chromatic aberration, halo, brightness, contrast, resizing and/or background. The noise may comprise salt/pepper noise.

The object type may comprise a traffic sign. In addition or as an alternative, the object type may comprise a road marking and/or a registration plate.

The method may further comprise using, by a machine learning-based object recognition system, the stored training image data of the object type as training images regarding the object type. The object recognition system using the stored training image data may comprise the computing device generating the training image data. Alternatively, the computing device generating the training image data and the object recognition system using the stored training image data may be separate entities.

According to a second aspect, a computer program product is provided. The computer program product may comprise portions of program code which, when executed on a computing device, cause the computing device to perform the method as herein described.

According to a third aspect, a computing device for generating training image data for a machine learning-based object recognition system is provided. The computing device comprises a processor unit and a data storage unit. The processor unit is configured to receive generic image data of an object type, receive recorded image data related to the object type, and modify the generic image data in accordance with at least one imaging-related parameter. The processor unit is further configured to determine a degree of similarity between the modified generic image data and the recorded image data, and, when the determined degree of similarity fulfills a similarity condition, store the modified generic image data as generated training image data of the object type.

The computing device may be a mobile communication device.

According to a fourth aspect, a machine learning-based object recognition system is provided. The machine learning-based object recognition system comprises a computing device as herein described.

According to a fifth aspect, a motor vehicle is described. The motor vehicle comprises a computing device as herein described.

BRIEF DESCRIPTION OF THE DRAWINGS

Further details, objectives and advantages of the invention will become apparent from the drawings and the detailed description. There is shown in FIGS. 1a-1j: Generic image representations of related object types, according to an example.

DETAILED DESCRIPTION

FIGS. 1a to 1j show different examples of related object types. In the shown examples, each of the object types represents a traffic sign according to a particular regional standard or jurisdiction. Moreover, the shown traffic signs have similar meanings as each sign defines a speed limit. FIGS. 1a to 1j show speed limit signs as used in, or according to, (in the same order) the Vienna convention, the United Kingdom, the alternative Vienna convention, Ireland, Japan, Samoa, the United Arab Emirates and Saudi Arabia, Canada, the USA, and the Oregon variant in the USA. The examples in FIGS. 1a to 1e resemble one another in their general appearance and the characters used. By contrast, the examples in FIGS. 1f and 1g differ significantly from the previous ones in the characters used, whereas in FIGS. 1h to 1j the shape of the traffic signs differs considerably from the rest.

Figure 1A:
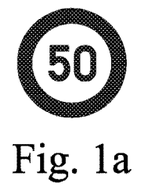
Figure 1B:
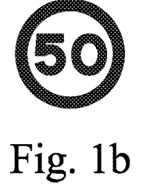
Figure 1C:
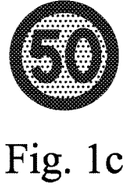
Figure 1D:
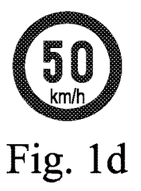
Figure 1E:
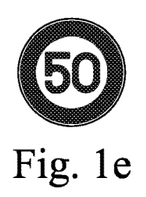
Figure 1F:
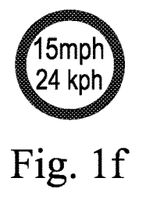
Figure 1G:
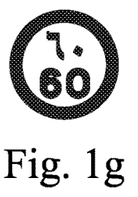
Figure 1H:
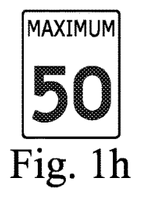
Figure 1I:
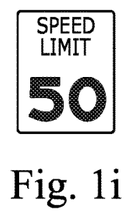
Figure 1J:
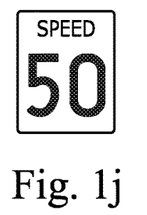

The traffic signs shown in FIGS. 1a to 1j confer show similarity among each other with regard to at least one of a shape or character group which is used for each sign. Nevertheless, all signs are different in their particular appearance. For an object recognition system to reliably identify one or more of the object types under real conditions, therefore, the system typically needs to be trained for each of the object types individually. For example, an object recognition system that is adapted to recognize traffic signs according to the Vienna convention, as shown in FIG. 1a, needs to be additionally trained for traffic signs as shown in FIG. 1b, when a user of the object recognition system intends to use the system in the United Kingdom. Meanwhile, in order not to unnecessarily consume computing and data storage resources of the object recognition system, corresponding additional training images are provided to the object recognition system, for example, when it is detected that the driver has changed his or her place from a position outside the United Kingdom to a position within the United Kingdom.

Figure 2:
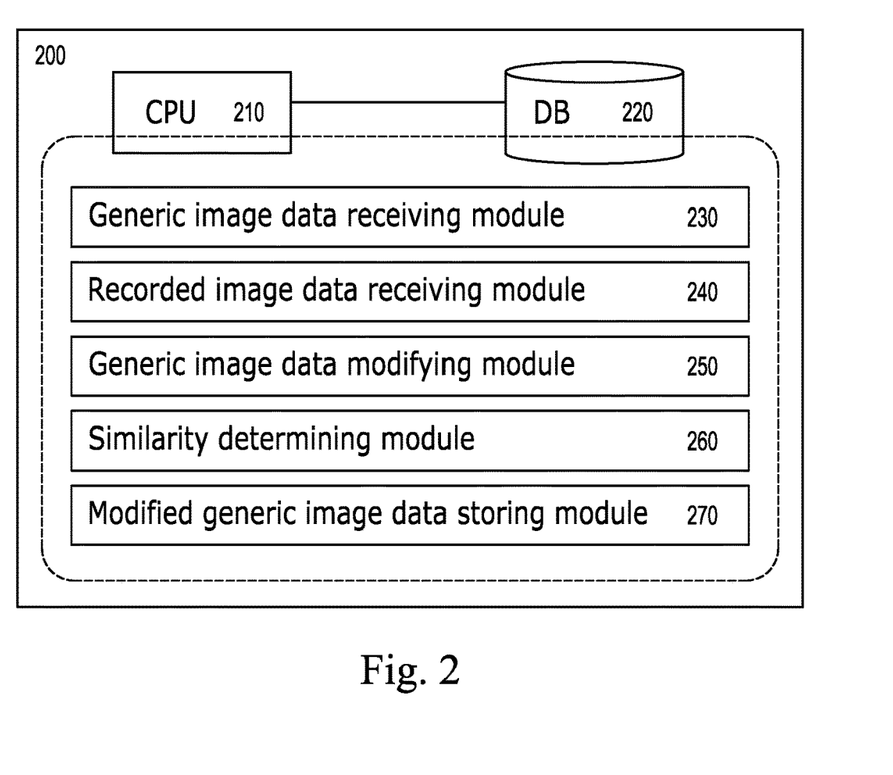
FIG. 2: A schematic representation of a computing device for generating training image data for a machine learning-based object recognition system, according to an embodiment.

FIG. 2 shows a schematic illustration of a computing device 200 for generating training image data for a machine learning-based object recognition system according to an embodiment. The computing device 200 comprises a programmable processor unit 210 and a data storage unit 220 which is accessible to the processor unit 210. The processor unit 210 is programmed to provide, as functionalities of the computing device 200, a generic image data receiving module 230, a recorded image data receiving module 240, a generic image data modifying module 250, a similarity determining module 260, and a modified generic image data storing module 270. The processor unit 210 is programmed, for example, by means of program code which is stored by the data storage unit 220.

The generic image data receiving module 230 receives generic image data of an object type of which training images are to be generated. For example, the generic image data received by the generic image data receiving module 230 is generic image data of one of the traffic sign types shown in FIGS. 1a to 1j. The generic image data corresponds, for example, to an idealized representation of the corresponding traffic sign. In other examples, however, the generic image data corresponds to other object types. Moreover, in some examples the generic image data does not correspond to an idealized representation of the object type.

Receiving the generic image data by the generic image data receiving module 230 is triggered, for example, when a need for training images of the object type has been identified by, or has been indicated to, the computing device 200. In some examples, the generic image data is included in a database that is stored by the data storage unit 220. In other examples, the generic image data receiving module 230 receives the generic image data from a source external to the computing device 200.

The recorded image data receiving module 240 is configured to receive recorded image data related to the object type. The recorded image data includes, for example, recorded real-life images of the object type which have been manually labelled as being related to the object type.

In some examples, the recorded image data comprises recorded images of the object type of which training image data is to be generated. In other examples, the recorded image data comprises recorded images of one or more object types which are related to, but different from, the object type of which training image data is to be generated. In that case, for example, the recorded image data comprises recorded images of one or more of the traffic signs shown in FIGS. 1a to 1j other than the traffic sign of which training image data is to be generated.

In some examples, the recorded image data related to the object type is included in a database that is stored by the data storage unit 220. In other examples, the recorded image data receiving module 240 receives the recorded image data from a source external to the computing device 200.

In some examples, the recorded image data differs from the generic image data in that the recorded image data represents diverse imaging conditions under which the recorded image data has been recorded. The imaging conditions include, for example, one or more imaging-related parameters, such as optical distortion, noise and blur of the camera used for recording the image data, or a perspective, a shadow, corrosion, brightness or background of the recorded object. By contrast, the generic image data includes, in some examples, image data that reflects less or different influences of the above imaging conditions. For example, the generic image data includes idealized image representations of the object type of which training image data is to be generated.

The generic image data modifying module 250 is configured to modify the received generic image data with respect to at least one imaging-related parameter. For example, in accordance with the above examples, the generic image data modifying module 250 modifies the generic image data with respect to optical distortion, noise, blur, brightness, shadow and/or background. In particular, the generic image data modifying module 250 modifies the generic image data so as to introduce or alter an effect of the respective imaging-related parameter on the generic image data. For example, the generic image data modifying module 250 modifies idealized image representations of the object type included in the generic image data so as to imitate imaging-related influences that typically affect real-life image recordings. In that manner, quasi-real-life images are generated from the generic image data by means of the generic image data modifying module 250.

The similarity determining module 260 determines a degree of similarity between the modified generic image data produced by the generic image data modifying module 250 and the recorded image data received by the recorded image data receiving module 240. For example, the similarity determining module is configured to quantify based on a metric a similarity between the modified generic image data and the recorded image data with respect to the one or more imaging-related parameters.

The modified generic image data storing module 270 is configured to effectuate storing of the modified generic image data as generated training image data of the object type, when the degree of similarity as determined by the similarity determining module 260 fulfils a similarity condition. For example, when the similarity between the modified generic image data and the recorded image data is larger than a threshold degree of similarity, the modified generic image data storing module 270 stores the modified generic image data in the data storage unit 220 as training image data of the object type for use by a machine learning-based object recognition system regarding the object type. Conversely, when the determined degree of similarity is less than the threshold degree, the modified generic image data storing module 270 rejects, in some examples, the modified generic image data or refers such data back to the generic image data modifying module 250, for further modifying.

In some of the above examples, the threshold degree of similarity is chosen such that fulfillment of the threshold degree indicates that the generic image data has been modified with respect to the one or more imaging-related parameters in such a way that the modified generic image data resembles real-life images of the object type to such an extent that the modified generic image data is suited to improve performance of a machine learning-based object recognition system regarding the object type, when the modified generic image data is used as training image data for the object recognition system. In other examples, the threshold degree of similarity is determined based on further or different criteria.

In some examples, the generic image data is modified randomly with respect to the at least one imaging-related parameters. In other examples, the generic image data is modified at least partly systematically with respect to the at least one imaging-related parameters. For example, the at least one imaging-related parameter is varied by a predetermined rule between successive modifications of generic image data. Moreover, in some examples, the generic image data is modified repeatedly, wherein the imaging-related parameters are varied between each repetition so as to generate different sets of modified generic image data. In further examples, modified generic image data sets that have been determined to fail the similarity condition are referred back for repeated modification.

By means of the aforementioned techniques, the computing device 200 enables generating training images of a particular object type, from generic image data of the object type, by using recorded image data related to the object type. This enables in particular the provision of training images while dispensing with a manual recording and labelling of each training image for each object type. Furthermore, the described generating of training images can be performed repeatedly, until a desired amount of sufficiently realistic sets of modified generic image data of the object type has been generated and stored.

Figure 3:
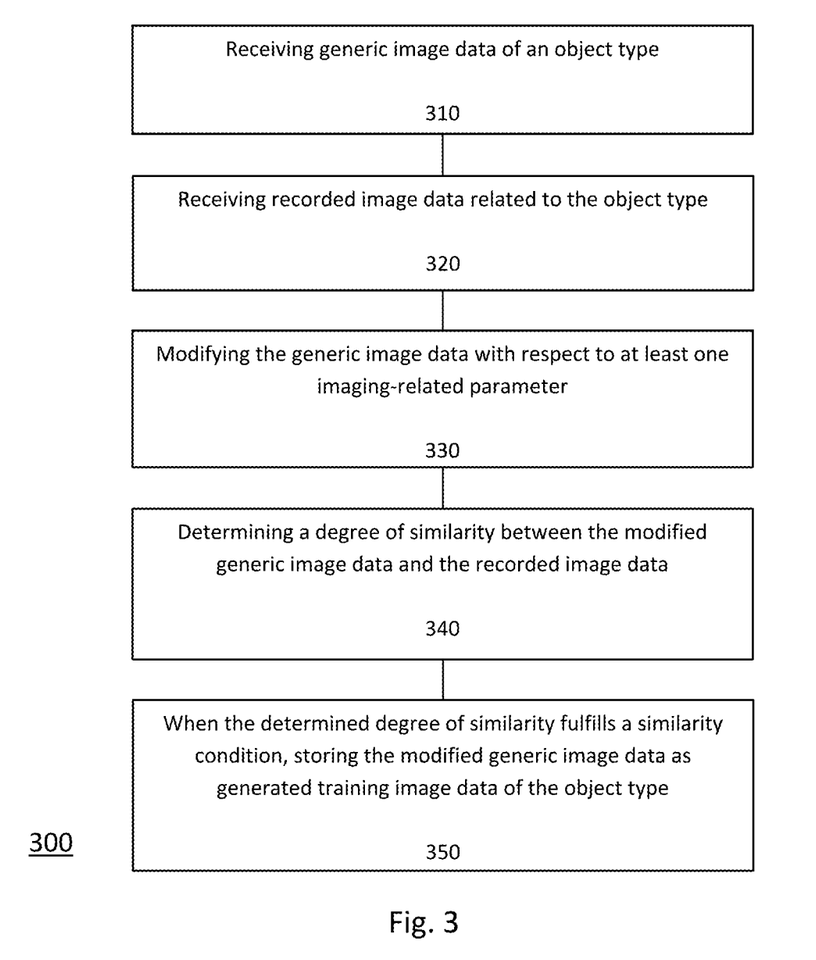
FIG. 3: A flow diagram of a method for generating training image data for a machine learning-based object recognition system, according to an embodiment.

FIG. 3 shows a flow diagram of a method 300 for generating training image data for a machine learning-based object recognition system. The method 300 is performed, for example, by the computing device 200 of FIG. 2. The method 300 comprises receiving generic image data of an object type, step 310, and receiving recorded image data related to the object type, step 320. The method 300 further comprises modifying the generic image data with respect to at least one imaging-related parameter, step 330, and determining a degree of similarity between the modified generic image data and the recorded image data, step 340, as has been described in more detail in connection with the computing device 200 of FIG. 2. When the determined degree of similarity fulfils a similarity condition, the modified generic image data is stored as generated training image data of the object type, step 350.

Figure 4:
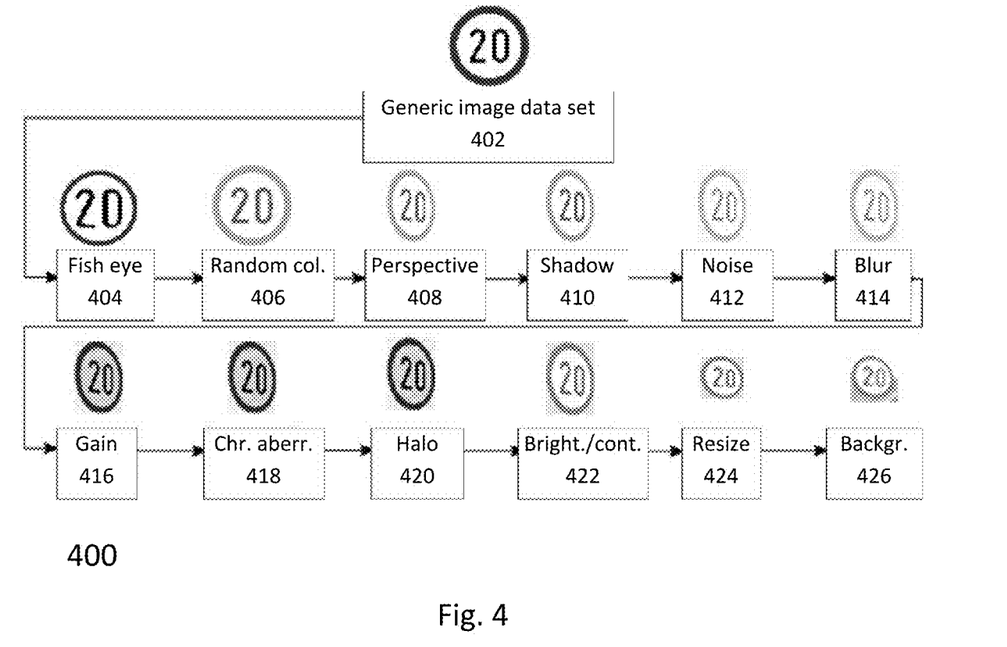
FIG. 4: A flow diagram of modifying generic image data with respect to at least one imaging-related parameter, according to an embodiment.

FIG. 4 shows a flow diagram of a sub-process 400 for modifying generic image data 402 with respect to at least one imaging-related parameter 404-426. The process 400 is executed, for example, by the generic image data modifying module 250 of the computing device 200 and/or as part of the modifying step 330 of the method 300. In the example of FIG. 4, the generic image data 402 corresponds to a generic image data set representing a traffic sign. However, in other examples the generic image data may represent any other object type. Moreover, in the example of FIG. 4, the generic image data set 402 is modified with respect to multiple imaging-related parameters 404-426. However, in other examples the generic image data set 402 may be modified with regard to less, further and/or other imaging-related parameters. Moreover, in other examples, the generic image data is modified with respect to the imaging-related parameter in a different order than what is shown in FIG. 4.

The imaging-related parameters 404-426 as shown in FIG. 4 include optical distortion, such as fish-eye distortion, 404. Especially fish-eye distortion is a common effect of wide angle lenses, as mounted, for example, in small video cameras, such as smartphone or on-board cameras. In order to modify the generic image data set 402 with respect to fish-eye distortion, a distortion factor and a distortion center are applied to the image data to have an effect on the x- and y-coordinates of at least some of the image pixels.

The generic image data may further be subject to colour randomizing 406. This emulates the case that the colours of different objects of an object type, for example traffic signs, have different intensities, typically due to variable illumination. The final pixels mixture is generated, for example, by varying each of individual BGR channels in the image data.

In step 408, the generic image data is modified with respect to perspective. Images of traffic signs, if viewed from a car, typically have a specific orientation. To imitate the perspective as observed from a car when passing near the sign, for example, the pixel grid is deformed and then remapped according to a perspective angle in the range of +/−11°.

Many traffic sign images contain shadows, mainly due to different light sources, such as sunlight, reflections, etc., and/or obstacles, such as trees or buildings. In order to modify the generic image data accordingly, particular shadow shapes can be selected and superimposed to the image data, step 410. As an example, black pixels are generated on all image channels that fall within a shadow mask and are then smoothed, for example, using a Gaussian distribution filter. The thus generated shadow is then added to the traffic sign image and the individual channels are equalized.

Recorded images are typically affected by noise, especially salt/pepper noise. Accordingly, the generic image data is modified with respect to noise in step 412. For introducing salt/pepper noise, for example, a matrix is filled with Gaussian random generated values which are then further thresholded to obtain noisy black and white pixels. The original image is then convoluted with that noise matrix.

Images recorded by a moving camera often show motion blur. The generic image data is modified with respect to blur in step 414. For example, a box filter having a squared kernel size can be used for duplicating a linear motion blur. In that case, the blur direction is given by a so-called anchor point, which is chosen, for example, in the range of +/−1.

White noise, in the form of gain, is added in step 416. For that purpose, for example, the processed image is subtracted from a randomly generated three channels matrix.

A common phenomenon especially with small camera systems is chromatic aberration. The generic image data is modified with respect to chromatic aberration in step 418. In an image, chromatic aberration is perceived as colour fringing around edges with high contrast. To imitate the effect, for example, pixels on a random selected image channel become shifted.

The halo effect is imitated in step 420. Halo affects all image channels and blurs the image. To introduce that effect, for example, a Gaussian filter is used with a kernel size and standard deviation equal to the intended halo effect. The halo-transformed image is obtained, for example, by summing the source image and the difference between the source image and the blurred halo image.

Brightness and contrast typically vary with the illumination of the recorded scene. The generic data is modified with respect to brightness and contrast in step 422, for example, by multiplying the input pixel values by a first parameter and adding to the multiplied pixels an offset defined by a second parameter.

In many scenarios, the size of an object in a recorded image may vary. This is considered in step 424, for example, by generating a random-sized representation of the object.

In step 426, a background image is added to the generic image data. For example, the background image is randomly selected from a database of background images.

In some of the examples described in connection with FIGS. 2 and 3, the same generic image data 402 is modified repeatedly with regard to different subgroups of the imaging-related parameters 404-426 and/or with regard to the same, though differently varied, imaging-related parameters. In connection with such repeated modifying of the generic image data, one or more of the imaging-related parameters 404-426 are varied, for example, within a predefined range and/or by a predefined step width.

Figure 5:
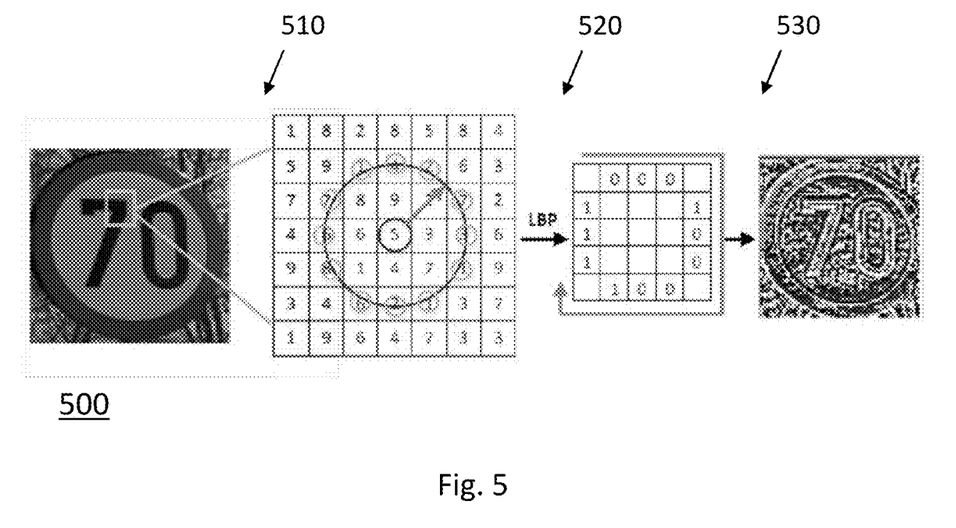
FIG. 5: A flow diagram of transforming image data using local binary patterns, LBP, according to an embodiment.

FIG. 5 shows a flow diagram of a sub-process 500 for pre-processing image data using local binary patterns, LBP. In some examples of the invention, the sub-process 500 is applied to the modified generic image data and/or the recorded image data as part of determining the similarity between the image data. In the particular example of FIG. 5, extended local binary patents, eLBP, are used to transform image data into an eLBP feature space. For that purpose, in step 510, a region-of-interest, ROI, mask around each pixel of the image data is applied. In the shown example, the ROI mask has a radius of 2 pixels around the respective pixel at the center.

In a subsequent step 520, each pixel is attributed a value in accordance with the local binary pattern including the determined ROI mask. In the shown example, brightness information in the original image data of the pixels that lie on the ROI mask, i.e., pixels that have a distance of two pixels from the pixel at the center, is brought into relation with the brightness information of that central pixel. If a pixel on the ROI mask has a brightness value greater than the central pixel, the value 1 is assigned to it, otherwise the value 0. The resultant pattern of ones and zeros is shown in FIG. 5 for the given example.

From the resultant set of binary digits, in a final step 503 a value is calculated for attribution to the central pixel. For example, the twelve binary digits are summed to determine a single scalar.

Transforming the image data by means of LBP facilitates in some examples the determining of a similarity with regard to relevant features, for example, concerning the imaging-related parameters with respect to which the generic image data has been modified. In particular, transforming the image data by means of LBP may be considered as a transformation of the image data from picture space to feature space. In the example of FIG. 5, a recorded image is subject to transforming, wherein an extended LBP with an ROI mask of a particular radius and based on brightness information has been used. However, the process 500 can be applied to any type of image data. Moreover, in other examples, other ROI masks or LBP patterns and/or other information than brightness information of the image pixels is used for transforming the image data from picture space to feature space.

Figure 6:
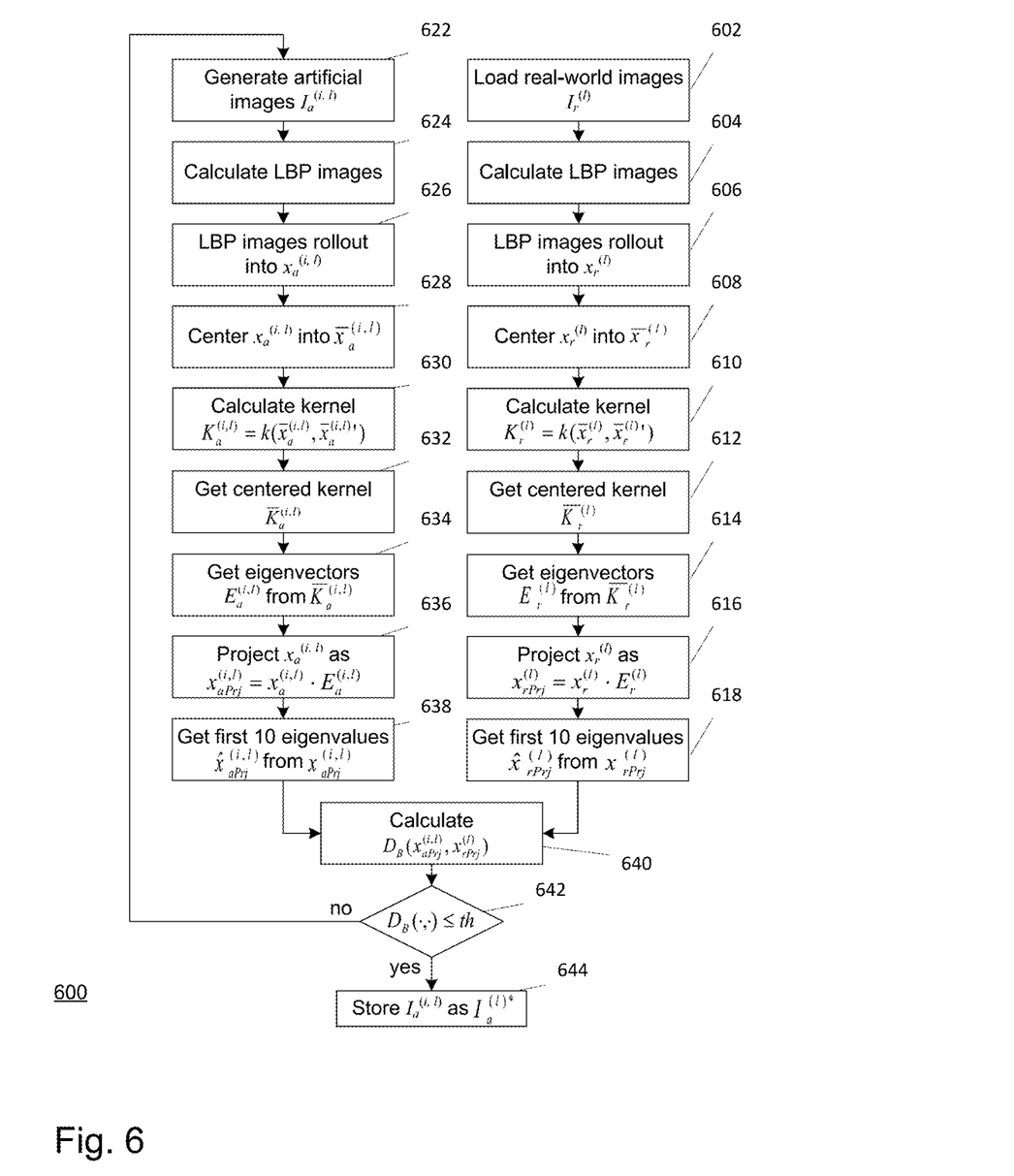
FIG. 6: A flow diagram of a method for generating training image data for a machine learning-based object recognition system, according to another embodiment.

FIG. 6 shows a flow diagram of a process 600 for determining a degree of similarity between different sets of image data. The process 600 is used in some examples of the invention for determining the degree of similarity between the modified generic image data and the recorded image data, as described above. The process 600 may be performed, for example, by the computing device 200 and/or as part of the method 300.

In accordance with some of the above examples, the process 600 includes generating modified generic image data, step 622, and obtaining recorded image data, step 602, and transforming each image data set into feature space, steps 604, 624. Transforming the image data into feature space is performed, for example, using the sub-process 500. Subsequently, the process 600 includes subjecting each of the transformed data types, that is, the entirety of the transformed modified generic image data independently from the entirety of the transformed recorded image data, to Kernel Principal Component Analysis, KPCA, steps 606-616, 626-636. Based on the result of that analysis, a degree of similarity between the different data types is determined, steps 618, 638, 640. Based on a similarity condition, the modified generic image data is then either stored as training image data or rejected, steps 642, 644.

Kernel Principal Component Analysis, KPCA, is described in detail in B. Schölkopf et al., "Non-Linear Component Analysis as a Kernel Eigenvalue Problem", *Neural Computation*, Massachusetts Institute of Technology, vol. 10, no. 5, 1998, pages 1299-1319. In what follows, application of KPCA in the particular context of the present invention will be described in more detail. The nomenclature as given in Table 1, in correspondence with FIG. 6, will be used. As shown in FIG. 6, the recorded real-world images are processed largely independently from the generation and the processing of the modified generic, or: artificial, images. Furthermore, processing both data types is performed analogously in both cases, in steps 604-618 as opposed to steps 624-638. The following description therefore applies analogously to the processing of either type of data.

Regarding recorded real-world images $I_r^{(l)}$, the method 600 begins with receiving such recorded image data, step 602, for example, by loading from a database one or more real-world images related to an object type. In this regard, the above details concerning the receiving step 320 of the method 300 and its implementation by the recorded image data receiving module 240 of the computing device 200 apply correspondingly.

For the generation of modified generic, or artificial, image data $I_a^{(i,l)}$ in step 622, the above details about the receiving step 310 and the modifying step 330 of the method 300, the sub-process 400, and their exemplary implementations by means of the computing device 200 apply correspondingly. For example, in step 622, an idealized generic representation of the object type in the form of generic image data is modified repeatedly with regard to differently chosen and/or differently, for example randomly, set imaging-related parameters, in order to generate multiple sets i of randomly modified image representations of the object type I, as described for some examples above.

In a subsequent pair of steps 604, 624, each of the recorded or generated images is transformed into feature space using local binary patterns, for example, as described in connection with the sub-process 500 of FIG. 5. In other examples of the method 600, however, the steps 604, 624 of transforming the images are omitted.

In steps 606, 626, each image as it results from the previous steps is rolled out so as to form a vector with all pixel data of the image being sequentially arranged. In some examples, the steps 606, 626 further include remapping the image data so as to standardize the size of each data set to correspond to an image having a fixed size, for example, of 25×25 pixels. In that way, a standardized vector size of the rolled-out images and/or a reduction of the data for further processing are achieved. The vectors resulting from the roll-out are subsequently gathered to form an artificial samples matrix $x_a^{(i,I)}$ and a real-world samples matrix $x_r^{(I)}$. For example, each row of either of these matrixes corresponds to one of the one-dimensional rollouts of any of the images resulting from the previous steps.

In steps 608, 628, each of the two samples matrixes $x_a^{(i,I)}$, $x_r^{(I)}$ becomes centered to form a mean centered matrix $\bar{x}_a^{(i,I)}$ of artificial samples and a mean centered matrix $\bar{x}_r^{(I)}$ of real-world samples. The centering is performed, for example, by subtracting from each entry of either matrix $x_a^{(i,I)}$, $x_r^{(I)}$ the arithmetic mean of the entries of the respective matrix. In other examples, the centering is performed differently, for example, by using a different type of mean. Centering the matrixes facilitates in some examples a low-dimensional representation of the features. In other examples of the method 600 the centering steps 608, 628 are omitted.

In steps 610, 630, each of the two matrixes $\bar{x}_a^{(i,I)}$, $\bar{x}_r^{(I)}$ as obtained from the preceding steps becomes subject to a kernel function $k(\bullet,\bullet)$, thus producing an artificial samples kernel matrix $K_a^{(i,I)}$ and a real-world samples kernel matrix $K_r^{(I)}$. The kernel function $k(\bullet,\bullet)$ can be considered to allow for an evaluation of a mapping function $\phi$ from the original multi-dimensional space $R^d$ into an inner product space F, wherein F is a new feature space. $\phi$ applied to any of the rolled-out vectors thus represents that vector projected into the new feature space. For the kernel function $k(\bullet,\bullet)$, for example, a radial basis kernel is implemented to determine the kernel matrixes, such as $$K = k(X, X') = e^{\frac{-\|x - x'\|^2}{2\sigma^2}}.$$

In other examples of the method 600, other kernel functions are implemented.

In steps 612, 632, each of the samples kernel matrixes $K_a^{(i,I)}$, $K_r^{(I)}$ becomes centered again to obtain the centered samples kernel matrixes $\bar{K}_a^{(i,I)}$, $\bar{K}_r^{(I)}$. Centering each of the kernel matrixes $K_a^{(i,I)}$, $K_r^{(I)}$ is done, for example, according to the equation $K_c = K - 1_n K - K 1_n + 1_n K 1_n$. In other examples, other methods of centering the kernel matrixes are used.

In steps 614, 634, the eigenvectors $E_a^{(i,I)}$, $E_r^{(I)}$ of each of the centered artificial samples kernel matrix $\bar{K}_a^{(i,I)}$ and the centered real-world samples kernel matrix $\bar{K}_r^{(I)}$ are computed, for example, by using singular values decomposition, SVD. In other examples, the eigenvectors are extracted from each of the centered kernel matrixes by using a different technique.

In steps 616, 636, each of the rolled-out images $x_a^{(i,I)}$, $x_r^{(I)}$ as obtained in steps 606, 626 becomes projected onto each of the respective set of eigenvectors $E_a^{(i,I)}$, $E_r^{(I)}$ of the centered kernel matrix $\bar{K}_a^{(i,I)}$, $\bar{K}_r^{(I)}$ to which the respective rolled-out image $x_a^{(i,I)}$, $x_r^{(I)}$ pertains. The resultant projection coefficients are collected in the corresponding projection matrixes $x_{aPrj}^{(i,I)}$, $x_{rPrj}^{(I)}$.

In steps 618, 638, the first ten eigenvalues $\hat{x}_{aPrj}^{(i,I)}$, $\hat{x}_{rPrj}^{(I)}$ of each of the projection matrixes $x_{aPrj}^{(i,I)}$, $x_{rPrj}^{(I)}$ are determined. However, in other examples of the method 600 a different number of eigenvalues is determined. Whereas a larger number of eigenvalues increases accuracy of the described technique, a smaller number allows for a more efficient implementation.

Based on the preceding component analysis, in step 640 a degree of similarity between the data resulting from the preceding steps is determined. In the example of FIG. 6, the degree of similarity is calculated in accordance with a Bhattacharyya distance between the resultant data representative of the modified generic image data and data representative of the recorded image data, as resulting from the respective projection matrixes $x_{aPrj}^{(i,I)}$, $x_{rPrj}^{(I)}$. In other examples of the method 600, a different metric, for example a Euclidean distance, for quantifying the degree of similarity is used.

The Bhattacharyya distance is calculated, for example, using the following formula:

$$d_B(x, y) = \sqrt{1 - \frac{1}{\sqrt{\bar{x} \cdot \bar{y} \cdot N^2}} \cdot \sum_{i=0}^{N} \sqrt{x_i \cdot y_i}}$$

where:
$x = [x_1 \; x_2 \; \ldots \; x_N]$—first input row vector
$y = [y_1 \; y_2 \; \ldots \; y_N]$—second input row vector
N—number of columns in vectors x and y (N=columns(x)=columns(y))
$x_i$—element from vector x ($i \in \{1, \ldots, N\}$)
$y_i$—element from vector y ($i \in \{1, \ldots, N\}$)
$\bar{x}$—mean value of x
$\bar{y}$—mean value of y The final Bhattacharyya distance $D_B$ between two matrices x and y is calculated as the mean of the Bhattacharyya distances $d_B$ between each row from x with each row from y:

$$D_B = \frac{\sum_{q=1}^{N_a} \sum_{w=1}^{N_r} d_B(x[q], y[w])}{N_a \cdot N_r}$$

where:
$N_a$—number of rows in matrix x
$N_r$—number of rows in matrix v
x[q]—q from matrix x
x[w]—row w from matrix x In step 642 it is determined based on the calculated degree of similarity whether or not the generated artificial images $I_a^{(i,I)}$ fulfill a similarity condition. For example, it is determined whether or not the generic image data have been modified so as to resemble real-world images with regard to the one or more imaging related parameters sufficiently to be suited as training images. In the example of FIG. 6, the similarity condition corresponds to a minimal Bhattacharyya distance. Whether or not a Bhattacharyya distance is minimal is defined, for example, based on a threshold Bhattacharyya distance. In some examples, a threshold Bhattacharyya distance has been predetermined. In other examples, one out of multiple generated artificial image sets is chosen that has the smallest Bhattacharyya distance from the data representative of the real-world images.

In the case that the generated artificial images $I_a^{(i,I)}$ fulfill the similarity condition, the entirety of the generated artificial images $I_a^{(i,I)}$ is stored as generated training images $I_a^{(I)*}$ of the object type. If it is determined that the generated artificial images $I_a^{(i,l)}$ fail the similarity condition, the entirety of generated artificial images $I_a^{(i,l)}$ is rejected and new artificial image data is generated. The method 600 is continued in some examples, until a desired amount of generated training images has been obtained and stored.

The method 600, especially the use of KPCA, allows for an efficient comparison of larger image sets. In combination with a statistical, or random-like, modifying of generic image data, the method 600 thus allows for a simple and efficient generation and selection of generated image data over a wide range of imaging-related parameters. At the same time, it provides relevant criteria for ensuring suitability of the generated image data as training images for a particular object type. The described generating of training images further enables reduced memory consumption for providing training images, as only a small amount of real-world images needs to be kept available and can be used for various object types. It further facilitates a dynamic provision of training images of any of multiple object types in accordance with a current need.

Figure 7:
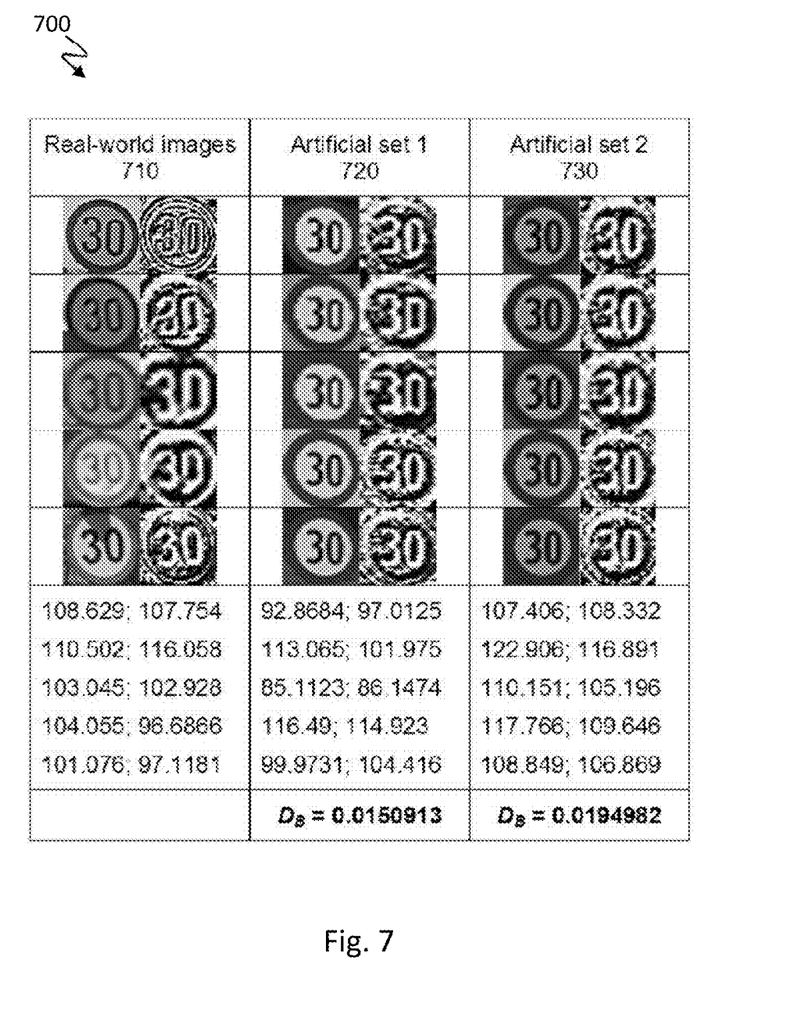
FIG. 7: A schematic representation of recorded and modified image data sets, according to an example.

FIG. 7 shows an example of an assortment 700 of image data related to an object type. The assortment 700 includes recorded images 710 and modified generic images 720, 730, together with their respective LBP transformations. The group 710 of recorded images corresponds, for example, to the real-world images $I_r^{(l)}$ of FIG. 6, whereas either group 720, 730 of modified generic images corresponds to the $I_a^{(i,l)}$ of FIG. 6. Each of the artificial images 720, 730 has been produced, for example, from generic image data of the object type in accordance with the above-described techniques.

Following the images 710, 720, 730 the assortment 700 further includes in each column the first two principle components of each image, in the same order, as determined, for example, by the method 600. In addition, the last entry in the second and the third columns represents the respective Bhattacharyya distance for either group of images relative to the real-world images 710, as determined, for example, by the method 600. Based on its respective Bhattacharyya distance, a group of modified generic images 720, 730 may either be stored as suited training images or be rejected for not providing a sufficient similarity with the real-world images 710, in accordance with some of the examples described above.

Figure 8:
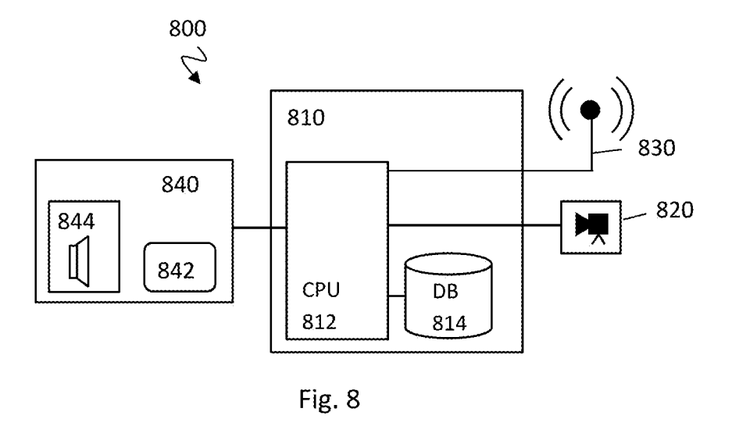
FIG. 8: A schematic representation of a machine learning-based object recognition system comprising a computing device for generating training image data for the machine learning-based object recognition system, according to an embodiment.

FIG. 8 shows a schematic representation of a machine learning-based object recognition system 800. The system 800 comprises a computing device 810 having a programmable processor unit 812 and a data storage unit 814. With regard to the computing device 810, the processor unit 812, and the data storage 814, the details set forth above in connection with the computing device 200, the processer unit 210 and the data storage unit 220 apply correspondingly. In particular, the computing device 810 is suited for generating training image data for the machine learning-based object recognition system 800. The system 800 further comprises a camera 820, a wireless communication unit 830 and a user interface 840. In the example of FIG. 8, the user interface 840 includes a display device 842 and a loud-speaker unit 844 for outputting information to the user of the system 800.

The computing device 810 is configured to perform machine learning-based object recognition. For that purpose, the computing device 810 receives in some examples image data via the wireless communication unit 830. For example, the system 800 receives generic image data of an object type, recorded image data related to the object type and/or a trigger signal to perform generating training image data of an object type via the wireless communication unit 830. Based on the received information, the computing device 810 generates training image data of the object type, in accordance with any of the above-described techniques. The object recognition system 800 then uses that generated training image data for machine-learning to become trained for object recognition regarding the object type.

Once the system 800 has become trained with regard to the object type, when the system 800 acquires an image of the object type by means of the camera 820 it is likely to recognize the object type in the acquired image. In that case, the computing device 810 outputs in some examples a signal which indicates recognition of the object type. The signal is output, for example, to the user interface 840 to inform a user of the system 800 about the recognized object type, for example by means of the display device 842 and/or the loud-speaker unit 844.

Figure 9:
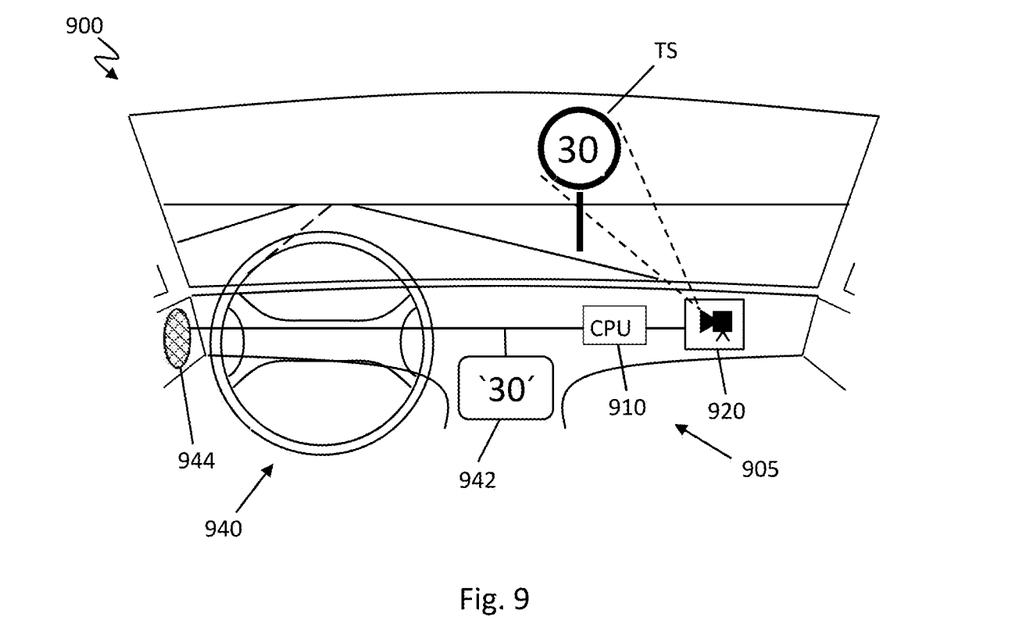
FIG. 9: A schematic representation of a motor vehicle comprising a computing device for generating training image data for a machine learning-based object recognition system, according to an embodiment.

FIG. 9 shows a schematic illustration of a car 900 comprising a computing device 910. With regard to the computing device 910, the details set forth in connection with the computing device 200 and the computing device 810 apply correspondingly. In particular, the computing device 910 is suited for generating training image data for a machine learning-based object recognition system, in accordance with any of the above-described techniques. The car 900 further comprises a camera 920 and a user interface 940 including a display device 942 and a loud-speaker unit 944.

In the example of FIG. 9, the computing device 910, the camera 920, and the user interface 940 form a machine learning-based object recognition system 905. With regard to the object recognition system 905, the details set forth in connection with the object recognition system 800 apply correspondingly. In particular, in some examples the object recognition system 905 further comprises a wireless communication unit (not shown). In other examples, the object recognition system 905 does not comprise a wireless communication unit. In that case, in some examples, a variety of generic image data of various object types is stored in the data storage unit of the computing device 910.

Based on user input, or any other triggering input, the computing device 910 performs, by any of the methods described herein, the generation of training image data regarding any of the object types represented by the stored generic image data. This can be performed in accordance with an indicated need. For example, a driver of the car 900 can change his position from one region, for which the system 905 has been adapted, to a different region, where different traffic-related technical standards are used, for example, traffic signs TS of a different appearance. By implementing any of the techniques described herein, the system 905 is suited to flexibly adapt itself to such new object types.

TABLE 1 i - generated images dataset i
l - object label (e.g. speed limit sign 10 Km/h, 20 Km/h, etc.)
$I_a^{(i,\,l)}$ - set i of artificial images for object type l
$I_r^{(l)}$ - set of real-world images of object type l
$x_a^{(i,\,l)}$ - artificial LBP samples matrix; each row is a 1D roll-out of an LBP image obtained from $I_a^{(i,\,l)}$
$x_r^{(l)}$ - real-world LBP samples matrix; each row is a 1D roll-out of an LBP image obtained from $I_r^{(l)}$
$\overline{x}_a^{(i,\,l)}$ - mean centered matrix of $x_a^{(i,\,l)}$
$\overline{x}_r^{(l)}$ - mean centered matrix of $x_r^{(l)}$
$k(\bullet,\bullet)$ - kernel function
$K_a^{(i,\,l)}$ - artificial samples kernel matrix
$K_r^{(l)}$ - real-world samples kernel matrix
$\overline{K}_a^{(i,\,l)}$ - centered artificial samples kernel matrix TABLE 1-continued $\overline{K}_r^{(l)}$ - centered real-world samples kernel matrix
$E_a^{(i, l)}$ - eigenvectors of $\overline{K}_a^{(i, l)}$ extracted using SVD
$E_r^{(l)}$ - eigenvectors of $\overline{K}_r^{(l)}$ extracted using SVD
$\hat{x}_{aPrj}^{(i, l)}$ - projection of $x_a^{(i, l)}$ obtained from its multiplication with the eigenvectors $E_a^{(i, l)}$
$\hat{x}_{rPrj}^{(l)}$ - projection of $x_r^{(l)}$ obtained from its multiplication with the eigenvectors $E_r^{(l)}$
$x_{aPrj}^{(i, l)}$ first 10 columns of matrix $\hat{x}_{aPrj}^{(i, l)}$
$x_{rPrj}^{(l)}$ - first 10 columns of matrix $\hat{x}_{rPrj}^{(l)}$
$D_B(\bullet,\bullet)$ - Bhattacharyya distance function
$I_a^{(l)}*$ - set of optimal artificial training samples

The invention claimed is:

1. A method of generating training image data for a machine learning-based object recognition system, the method comprising:
   receiving generic image data of an object type;
   receiving recorded image data related to the object type, wherein the recorded image data includes recorded real-life images of the object type which have been manually labelled as being related to the object type;
   modifying the generic image data with respect to at least one imaging-related parameter;
   determining a degree of similarity ($D_B$) between the modified generic image data and the recorded image data, wherein determining the similarity comprises transforming the modified generic image data and the recorded image data from an image space to an extended Local Binary Patterns, eLBP, feature space using Local Binary Patterns, LBP, by positioning a region-of-interest, ROI, mask, having a radius, around each central pixel of both the modified generic image data and of the recorded image data and applying the ROI mask to each of the central pixels such that a respective scalar value in the eLBP feature space is attributed to each of the central pixels by summing a corresponding plurality of binary values generated by positioning and applying the ROI mask to each central pixel, wherein the plurality of binary values are determined based on comparing a relative brightness of each central pixel with each pixel along the ROI mask; and
   when the determined degree of similarity ($D_B$) fulfills a similarity condition, storing the modified generic image data as generated training image data of the object type.

2. The method of claim 1, wherein determining the similarity comprises subjecting the modified generic image data and the recorded image data to Kernel Principal Component Analysis, KPCA.

3. The method of claim 2, wherein the degree of similarity ($D_B$) is determined based on a Bhattacharyya distance between data representative of the modified generic image data and data representative of the recorded image data.

4. The method of claim 3, further comprising:
   when the determined degree of similarity fails to fulfill the similarity condition, rejecting the modified generic image data.

5. The method of claim 4, wherein the recorded image data comprises one or more recorded image data sets, each recorded image data set comprising data corresponding to a recorded real-world image related to the object type, and wherein the modified generic image data comprises one or more modified image data sets, each modified image data set comprising data corresponding to a generated image of the object type.

6. The method of claim 5, wherein an amount of modified image data sets is larger than an amount of recorded image data sets.

7. The method of claim 6, wherein at least two of the modified image data sets are produced by repeatedly modifying the generic image data differently with respect to the imaging-related parameter and/or by repeatedly modifying the generic image data with respect to different imaging-related parameters, respectively.

8. The method of claim 7, wherein modifying the generic image data is performed repeatedly and wherein the imaging-related parameter is varied by at least a predetermined amount between successive modifications of the generic image data.

9. The method of claim 8, wherein the at least one imaging-related parameter comprises at least one of: fisheye distortion, color randomizing, perspective, shadow, noise, blur, gain, chromatic aberration, halo, brightness, contrast, resizing and/or background.

10. The method of claim 9, wherein the object type comprises a traffic sign (TS).

11. The method of claim 10, further comprising:
   using, by a machine learning-based object recognition system, the stored training image data of the object type as training images regarding the object type.

12. A computing device for generating training image data for a machine learning-based object recognition system, the computing device comprising a processor unit and a data storage unit, wherein the processor unit is configured to:
   receive generic image data of an object type;
   receive recorded image data related to the object type, wherein the recorded image data includes recorded real-life images of the object type which have been manually labelled as being related to the object type;
   modify the generic image data in accordance with at least one imaging-related parameter;
   determine a degree of similarity between the modified generic image data and the recorded image data, wherein determining the similarity comprises transforming the modified generic image data and the recorded image data from an image space to an extended Local Binary Patterns, eLBP, feature space using Local Binary Patterns, LBP, by positioning a region-of-interest, ROI, mask, having a radius, around each central pixel of both the modified generic image data and of the recorded image data and applying the ROI mask to each of the central pixels such that a respective scalar value in the eLBP feature space is attributed to each of the central pixels by summing a corresponding plurality of binary values generated by positioning and applying the ROI mask to each central pixel, wherein the plurality of binary values are determined based on comparing a relative brightness of each central pixel with each pixel along the ROI mask; and
   when the determined degree of similarity fulfills a similarity condition, store the modified generic image data as generated training image data of the object type.

13. The method of claim 11, wherein the recorded image data includes recorded real-life images of one or more object types which are related to, but different from, the object type which have been manually labelled as being related to the object type.

* * * * *

UNITED STATES PATENT AND TRADEMARK OFFICE
CERTIFICATE OF CORRECTION

PATENT NO. : 10,635,935 B2  
APPLICATION NO. : 15/845429  
DATED : April 28, 2020  
INVENTOR(S) : Tiberiu Cocias et al.

Page 1 of 1

It is certified that error appears in the above-identified patent and that said Letters Patent is hereby corrected as shown below:

On the Title Page  
Item [72], INVENTORS:  
Line 5, change "Transnea" to -- "Transea" --.

Signed and Sealed this  
Seventh Day of February, 2023

Katherine Kelly Vidal  
*Director of the United States Patent and Trademark Office*